US008897317B2

(12) United States Patent
Doppler et al.

(10) Patent No.: US 8,897,317 B2
(45) Date of Patent: Nov. 25, 2014

(54) DISTRIBUTED CAPACITY BASED CHANNEL ASSIGNMENT FOR COMMUNCATION SYSTEMS (75) Inventors: Klaus Doppler, Berkeley, CA (US); Martti Moisio, Haarajoki (FI); Athul Prasad, Espoo (FI)

(73) Assignee: Nokia Corporation, Espoo (FI)

( * ) Notice: Subject to any disclaimer, the term of this patent is extended or adjusted under 35 U.S.C. 154(b) by 203 days.

(21) Appl. No.: 13/422,377

(22) Filed: Mar. 16, 2012

(65) Prior Publication Data

US 2012/0236806 A1    Sep. 20, 2012

Related U.S. Application Data (60) Provisional application No. 61/453,859, filed on Mar. 17, 2011.

(51) Int. Cl.
*H04W 16/10*    (2009.01)
*H04W 28/16*    (2009.01)
*H04L 1/20*    (2006.01)
*H04W 28/04*    (2009.01)

(52) U.S. Cl.
CPC .............. *H04W 28/16* (2013.01); *H04W 16/10* (2013.01); *H04W 28/04* (2013.01); *H04L 1/20* (2013.01)
USPC ......................................... 370/437; 370/317

(58) Field of Classification Search
USPC .................. 370/317, 318, 437, 462
See application file for complete search history.

(56) References Cited

U.S. PATENT DOCUMENTS

2009/0227263 A1 * 9/2009 Agrawal et al. ............ 455/452.1
2010/0216477 A1 * 8/2010 Ryan ............................. 455/449
2011/0026422 A1   2/2011 Ma et al.

FOREIGN PATENT DOCUMENTS

EP      2257113 A1      1/2010
WO   2010140797 A2    12/2010

OTHER PUBLICATIONS

Garcia et al., Autonomous Component Carrier Selection—Interference Management in Local Area Environments for LTE-Advanced, Sep. 2009, IEEE Communications Magazine, p. 110-116.*
Extended European Search Report dated Oct. 8, 2014, issued in corresponding European Application No. EP12157025.3, 4 pages.
Motoki Morita et al., "CR on SDD Section 17: Multi-carrier Operation for Femtocell"; IEEE Draft; C80216m-09_0423; IEEE 802.16 Broadband Wireless Access Working Group; IEEE-SA, Piscataway, NJ USA; vol. 802.16m, Feb. 26, 2009, pp. 1-4, XP017730667, [retrieved on Feb. 27, 2009].

* cited by examiner

*Primary Examiner* — Hoon J Chung
(74) *Attorney, Agent, or Firm* — Squire Patton Boggs (US) LLP (57) ABSTRACT Apparatuses and methods for providing distributed capacity based channel assignment in a radio frequency base station servicing a local area. A method can include determining that an additional channel is needed, receiving reports from user equipment connected to the base station over the air interface indicating the gain in capacity due to the added channel, adding the new channel, receiving loss reports from one or more neighboring base stations indicating the loss in capacity and the interference caused to user equipments serviced by the neighboring base stations due to the use of the new channel. The method can also include comparing the gain in capacity to the loss of capacity by the worst user connected to the neighboring base stations due to the added channel and determining whether to continue to add the channel to increase capacity.

18 Claims, 7 Drawing Sheets

DISTRIBUTED CAPACITY BASED CHANNEL ASSIGNMENT FOR COMMUNCATION SYSTEMS

CROSS REFERENCE TO RELATED APPLICATIONS

The present application is related to and claims the priority of U.S. Provisional Patent Application No. 61/453,859, filed Mar. 17, 2011, the entirety of which is incorporated herein by reference.

BACKGROUND

1. Field

Communication systems may benefit from apparatuses and methods for providing additional capacity for local area communications over an air interface. Relevant air interfaces can include those used with radio frequency communication systems.

2. Description of the Related Art

As wireless communication systems such as cellular telephone, satellite, and microwave communication systems become more widely deployed and continue to attract a growing number of users, it may be valuable to accommodate a large and variable number of communication subsystems transmitting a growing volume of data with a fixed resource such as a fixed channel bandwidth accommodating a fixed data packet size. Traditional communication system designs employing a fixed resource, for example, a fixed data rate for each user, have become challenged to provide high, but flexible, data transmission rates in view of the rapidly growing customer base.

Conventional systems implement wireless communications using standard protocols including Universal Mobile Telecommunications System ("UMTS"), UMTS Terrestrial Radio Access Network ("UTRAN"), and third generation wireless ("3G") now extending to advanced standards including, for example, fourth generation wireless ("4G") and Wideband Code Division Multiple Access ("WCDMA") which support HSDPA communications between mobile equipment. The mobile equipment includes user equipment ("UE") such as cell phones, and fixed transceivers that support mobile telephone cells, such as base stations, referred to as "Node B" (or "NB") and when enhanced, or evolved to a new standard protocol, referred to as "e-Node B" (or "eNB").

The Third Generation Partnership Project Long Term Evolution ("3GPP LTE") is a name generally used to describe an ongoing effort across the industry to improve UMTS. The improvements are being made to cope with continuing new requirements and the growing base of users. Goals of this broadly based project include improving communication efficiency, lowering costs, improving services, making use of new spectrum opportunities, and achieving better integration with other open standards and backwards compatibility with some existing infrastructure that is compliant with earlier standards. Recently, the deployment of systems is extending to "LTE-Advanced" as additional bandwidth and features are added.

UTRAN includes multiple Radio Network Subsystems ("RNS"), each of which contains at least one Radio Network Controller ("RNC"). However, the RNC may not be present in all systems incorporating Long Term Evolution ("LTE") of UTRAN, evolved UTRAN ("E-UTRAN"). LTE may include a centralized or decentralized entity for control information. In UTRAN operation, each RNC may be connected to multiple Node Bs which are the UMTS counterparts to Global System for Mobile Communications ("GSM") base stations. In E-UTRAN systems, the e-Node B is, or may be, connected directly to the access gateway ("aGW," sometimes referred to as the services gateway "sGW"). Each Node B may be in radio contact with multiple UE devices (generally, user equipment including mobile transceivers or cellular phones, although other devices such as fixed cellular phones, mobile web browsers, tablets, ebook readers, navigation systems, laptops, PDAs, MP3 players, and gaming devices with transceivers may also be a UE) via the radio air interface.

The wireless communication systems as described herein are applicable to, for instance, 3G, and UTRAN systems as well as 3GPP LTE and LTE-A compatible wireless communication systems. In general, E-UTRAN resources are conventionally assigned by the network to one or more UE devices by use of various resource allocation means, or more generally by use of a downlink resource assignment channel or physical downlink control channel ("PDCCH"). LTE is a packet-based system and, therefore, there may not be a dedicated connection reserved for communication between a UE and the network. Users are generally scheduled on a shared channel every transmission time interval ("TTI") by a Node B or an e-Node B. A Node B or an e-Node B controls the communications between user equipment terminals in a cell served by the Node B or e-Node B. In general, one Node B or e-Node B serves each cell. Resources needed for data transfer are assigned either as one time assignments or in a persistent/semi-static way. The LTE, also referred to as 4G, generally supports a large number of users per cell with quasi-instantaneous access to radio resources in the active state.

Additional spectrum/bandwidth is being provided in various ways. In one approach to adding broadband spectrum, additional base stations for communications with user equipment are deployed. These may include so-called "femtocells" or cells provided by "Home enhanced Node B" stations, sometimes called "HeNBs". A HeNB may provide wireless interface to user equipment in a home, office, restaurant or other space where the users may share the resource. The user equipment devices may include cellular phones, PDAs, tablet computers, laptop computers, portable or fixed devices such as web browsers, audio players, video players and others. The area serviced by a femtocell or HeNB may be, for example, limited to 30 to 50 meters in radius. Deploying these base stations may provide users with a signal in the home or office, reducing or eliminating the need for wired telephones for example, and making it possible to rely on a cellular phone in buildings where previously, signal strength and reception were not sufficient. Additional bandwidth is also provided for the system, reducing the need for the eNB base station in the area to provide all of the wireless service. It is also envisioned that user equipment ("UE") can act as a HeNB.

One aspect of HeNB deployment is that, in contrast to the deployment of system managed base stations, the placement of new HeNBs is uncoordinated and may be performed by users. The HeNBs may be placed in very close physical proximity, such as installed in homes adjacent one another, in offices, apartments, townhomes and the like. A particular user equipment may, therefore, often be physically closer to a neighboring HeNB than the HeNB the user device is in cellular communication with, and interference between the HeNB cells can occur.

Multiple uncoordinated deployed HeNBs may operate on the same frequency band. Some of these networks may provide services not available from other HeNBs. The HeNBs and users may utilize closed subscriber groups ("CSGs"). A user interested in using these services may be physically closer to, or in better signaling receiving condition with, an interfering HeNB, instead of the HeNB of interest.

Typically, a frequency band has multiple channels and the HeNB operates on one of these channels. To minimize interference, HeNBs capable of causing strong interference to one another are conventionally placed on different channels. There are several further approaches to minimize interference. In one distributed approach, HeNBs try to maximize the path loss to other HeNBs sharing the same frequency channel. In an alternative approach, a centralized scheme is used in which the HeNBs report measurements to a network node, and the network node then assigns the channels in a manner that will reduce interference between HeNBs.

If an HeNB could utilize carrier aggregation, then additional capacity could be accessed by an HeNB. However, carrier aggregation for HeNBs is not conventionally known. For example, Release 10 of the LTE standard does not allow carrier aggregation for HeNBs. Conventionally, the interference coordination schemes have been limited to coordinating the interference with co-channel deployments of macro-cells.

An approach to address the interference that has been previously described in "Interference Management in Local Area Environments for LTE-Advanced," L. G. U. Garcia, K. I. Pedersen, and P. E. Mogensen, IEEE Communications Magazine, Vol. 47 (9):110-116, September 2009, which is hereby incorporated herein by reference in its entirety; as an autonomous component carrier selection scheme ("ACCS"). In this scheme, dynamic frequency reuse mechanisms are used. Each HeNB selects a subset of available component carriers in a distributed manner. The HeNBs also learn the environment using signal to interference plus noise ("SINR") estimates provided by active user equipment. The UEs measure the downlink received signals (from HeNB to UE) as part of normal system operations and these estimates may be collected. Based on long term statistics collected, SINR values are determined for all neighboring cells which can be considered as potential interferers. The proposed ACCS scheme also has the HeNBs or the network storing the environment information, for example, in background information matrices ("BIM") which are used later in the channel selection decision process.

In ACCS, it is proposed that each HeNB will maintain a list of potentially interfering cells. Also, the eNB measurements are aggregated into a table form; for example, an inter-cell radio resource allocation table ("RRAT"). This table contains information regarding which component carriers are allocated as primary and secondary carriers in the cells. Based on the information stored in the BIMs and the RRAT, the HeNBs do carrier selection in a distributed manner without violating the minimum SINR conditions for surrounding cells. One of the main assumptions in this scheme is the a priori knowledge of minimum target SINR values for primary and secondary carriers. These target SINR requirements can be set, for example, by a network planning tool or by the administering device such as an Operations and Maintenance tool which controls the HeNBs. ACCS is also described, for example, in a paper entitled "Autonomous Component Carrier Selection for Local Area Uncoordinated Deployment of LTE-Advanced," L. G. U. Garcia, K. I. Pedersen, and P. E. Mogensen, IEEE Vehicular Technology Conference (VTC), Anchorage Ak., USA September 2009, which is hereby incorporated herein by reference in its entirety.

In future standards, such as future LTE-Advanced standards, it is foreseen that the use of carrier aggregation will be supported for HeNBs. Further, it is also clear that if the HeNBs are deployed with similar density as for wireless hotspots ("Wi-Fi" access points) then some interference management between deployed HeNBs will be needed.

A need thus exists for systems and methods to efficiently provide carrier aggregation and interference management for local area base stations such as HeNBs for cellular communications, without the disadvantages of the known prior approaches.

SUMMARY

These and other needs are generally addressed or circumvented, and technical advantages are generally achieved, by advantageous embodiments as disclosed, for example, herein.

A method, according to certain embodiments, includes determining in a network device servicing a local area that an additional channel is needed. The method also includes receiving a report from a user equipment connected to the network device over an air interface indicating a first gain in capacity that would occur due to the additional channel. The method further includes adding a new channel. The method additionally includes receiving a loss report from one or more neighboring network devices indicating a loss in capacity of, or interference caused to at least one user equipment serviced by, the neighboring network devices. The method also includes comparing a second gain in capacity by user equipment connected to the network device to a threshold amount. The method further includes determining whether, based on the comparison, to continue to add the new channel to increase capacity.

An apparatus, in certain embodiments includes at least one processor and at least one memory including computer program code. The at least one memory and the computer program code are configured to, with the at least one processor, cause the apparatus at least to determine in a network device servicing a local area that an additional channel is needed. The at least one memory and the computer program code are also configured to, with the at least one processor, cause the apparatus at least to process a report received from a user equipment connected to the network device over an air interface indicating a first gain in capacity that would occur due to the additional channel. The at least one memory and the computer program code are further configured to, with the at least one processor, cause the apparatus at least to add a new channel. The at least one memory and the computer program code are additionally configured to, with the at least one processor, cause the apparatus at least to process a loss report received from one or more neighboring network devices indicating a loss in capacity of, or interference caused to at least one user equipment serviced by, the neighboring network devices. The at least one memory and the computer program code are also configured to, with the at least one processor, cause the apparatus at least to compare a second gain in capacity by user equipment connected to the network device to a threshold amount. The at least one memory and the computer program code are further configured to, with the at least one processor, cause the apparatus at least to determine whether, based on the comparison, to continue to add the new channel to increase capacity.

In certain embodiments, a non-transitory computer readable medium is encoded with instructions that, when executed in hardware, perform a process. The process includes determining in a network device servicing a local area that an additional channel is needed. The process also includes receiving a report from a user equipment connected to the network device over an air interface indicating a first gain in capacity that would occur due to the additional channel. The process further includes adding a new channel. The process additionally includes receiving a loss report from one or more neighboring network devices indicating a loss in capacity of, or interference caused to at least one user equipment serviced by, the neighboring network devices. The process also includes comparing a second gain in capacity by user equipment connected to the network device to a threshold amount. The process further includes determining whether, based on the comparison, to continue to add the new channel to increase capacity.

In certain embodiments, an apparatus includes determining means for determining in a network device servicing a local area that an additional channel is needed. The apparatus also includes receiving means for receiving a report from a user equipment connected to the network device over an air interface indicating a first gain in capacity that would occur due to the additional channel. The apparatus further includes adding means for adding a new channel. The apparatus additionally includes receiving a loss report from one or more neighboring network devices indicating a loss in capacity of, or interference caused to at least one user equipment serviced by, the neighboring network devices. The apparatus also includes comparing a second gain in capacity by user equipment connected to the network device to a threshold amount. The apparatus further includes determining whether, based on the comparison, to continue to add the new channel to increase capacity.

BRIEF DESCRIPTION OF THE DRAWINGS

For a more complete understanding of the invention, and the advantages thereof, reference is now made to the following descriptions taken in conjunction with the accompanying drawing, in which.

DETAILED DESCRIPTION

Figure 1:
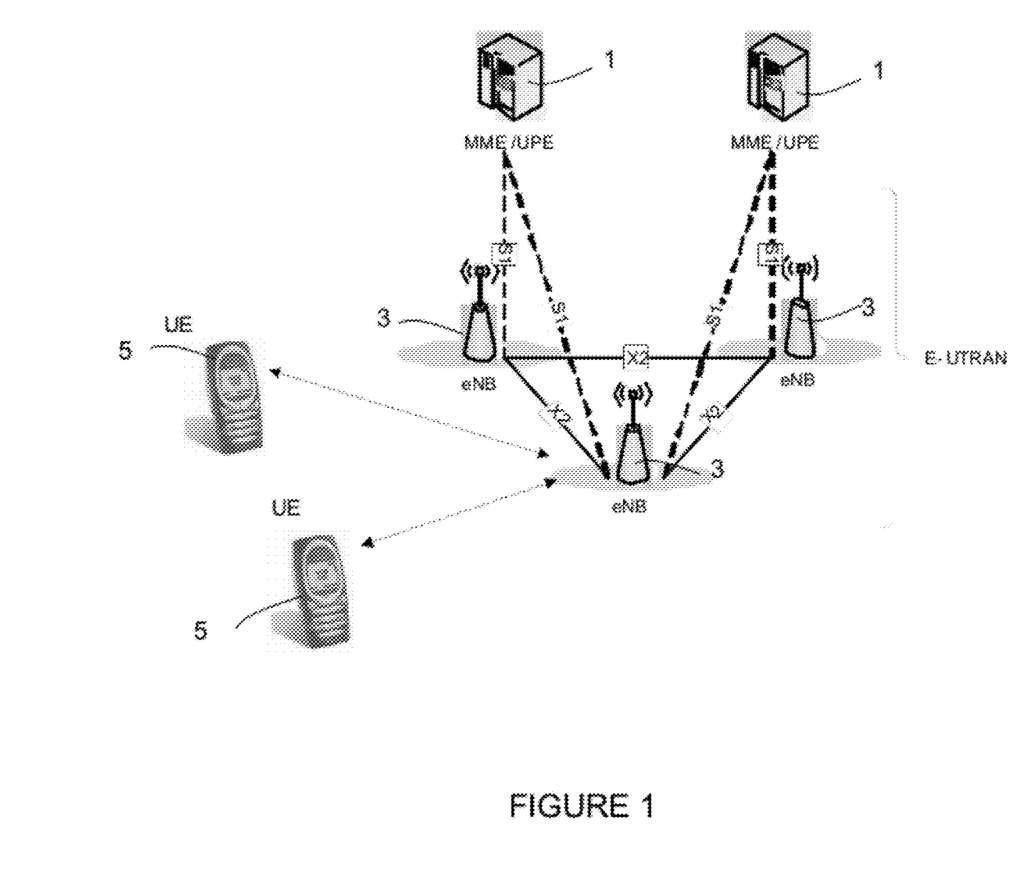
FIG. 1 illustrates a communications system according to an advantageous embodiment of the present invention.

FIG. 1 illustrates, in a system level diagram, a communication system including a wireless communication system that provides an environment for the application of the principles of certain embodiments. Alternative or additional features not shown in FIG. 1 for simplicity include the possibility of an air interface for the X2 link and device to device communications by UEs in different cells or between UEs. In one example, a UE may be configured to be a "master" device, allocating or adding channels, and collecting loss reports. The wireless communication system provides an E-UTRAN architecture including base stations 3 providing E-UTRAN user plane (packet data convergence protocol/radio link control/media access control/physical transport) and control plane (radio resource control) protocol terminations directed towards UEs 5. The base stations 3 are interconnected with an X2 interface or communication link. The base stations 3 are also connected by an S1 interface or communication link to an evolved packet core ("EPC") including, for instance, a mobility management entity ("MME") and a user plane entity ("UPE") 1, which may form an access gateway ("aGW"). The S1 interface supports a multiple entity relationship between the mobility management entities/user plane entities and the base stations and supports a functional split between the mobility management entities and the user plane entities.

The base stations 3 may host functions such as radio resource management, for example, internet protocol ("IP"), header compression and encryption of user data streams, ciphering of user data streams, radio bearer control, radio admission control, connection mobility control, and dynamic allocation of resources to user equipment in both the uplink and the downlink, selection of a mobility management entity at the user equipment attachment, routing of user plane data towards the user plane entity, scheduling and transmission of paging messages (originated from the mobility management entity 1), scheduling and transmission of broadcast information (originated from the mobility management entity or operations and maintenance), and measurement and reporting configuration for mobility and scheduling. The mobility management entity/user plane entity 1 may host functions such as distribution of paging messages to the base stations, security control, terminating user plane ("U-plane") packets for paging reasons, switching of U-plane for support of the user equipment mobility, idle state mobility control, and system architecture evolution bearer control. The user equipment receives an allocation of a group of information blocks from the base stations.

Figure 2:
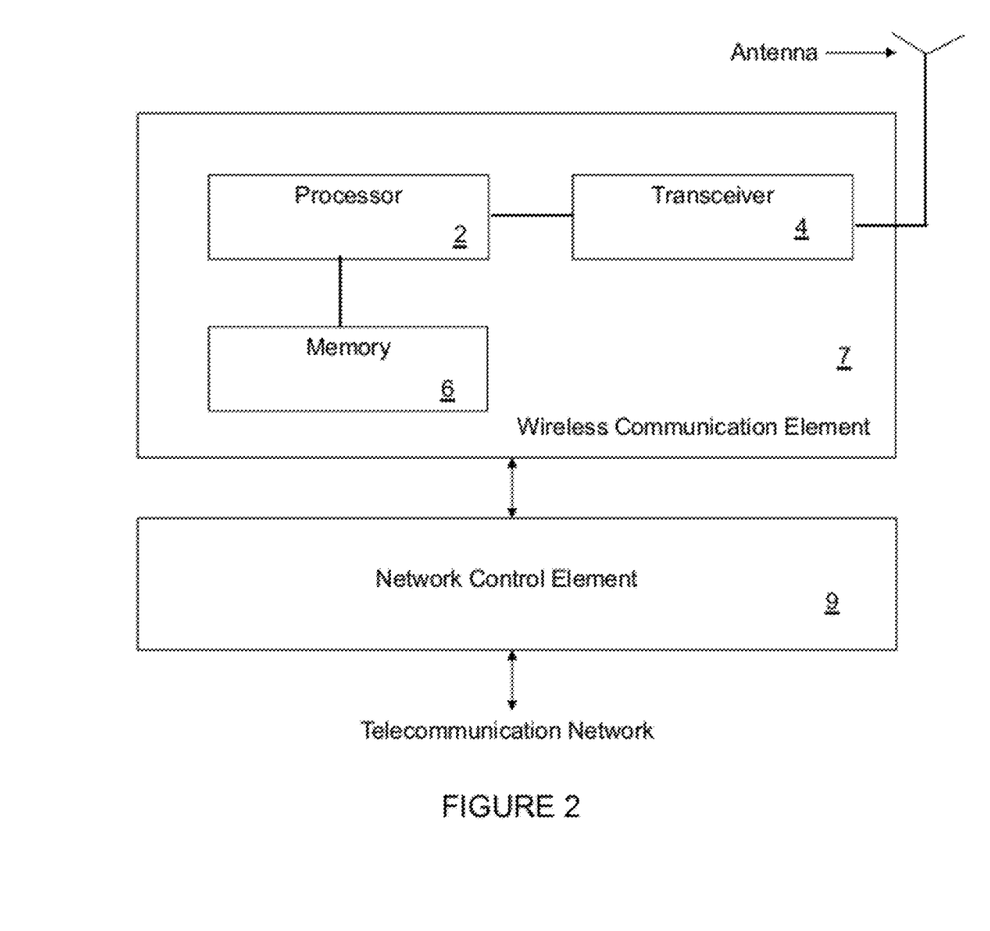
FIG. 2 illustrates user equipment communicating to an eNode B over an air interface, and an E-UTRAN communications system according to an advantageous embodiment of the present invention.

FIG. 2 illustrates a simplified system level diagram of an example communication element of a communication system that provides an environment and structure for application of the principles of certain embodiments. The communication element 7 may represent, without limitation, an apparatus including a base station or NB, UE such as a terminal or mobile station. The communication element includes, at least, a processor 2, memory 6 that stores programs and data of a temporary or more permanent nature, an antenna, and a radio frequency transceiver 4 coupled to the antenna and the processor for bidirectional wireless communication. Other functions may also be provided. The communication element may provide point-to-point and/or point-to-multipoint communication services.

The communication element 7, such as a base station in a cellular network, may be coupled to a network element 9, such as a network control element of a telecommunication network. The network control element 9 may, in turn, be formed with a processor, memory, and other electronic elements (not shown). The network control element 9 generally provides access to a telecommunication network such as a public switched telecommunication network ("PSTN"). Access may be provided using fiber optic, coaxial, twisted pair, microwave communication, or similar communication links coupled to an appropriate link-terminating element. A communication element 7 formed as a mobile station is generally a self-contained device intended to be carried by an end user; however in areas where wired services are not available the mobile station may be permanently installed at a fixed location as well.

The processor 2 in the communication element 7, which may be implemented with one or a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, hardware installation, traffic management, performance data analysis, tracking of end users and mobile stations, configuration management, end user administration, management of the mobile station, management of tariffs, subscriptions, and billing, and the like. The execution of all or portions of particular functions or processes related to management of resources may be performed in equipment separate from and/or coupled to the communication element, with the results of such functions or processes communicated for execution to the communication element. The processor 2 of the communication element may be of any type suitable to the local application environment, and may include one or more of general-purpose computers, special-purpose computers, microprocessors, digital signal processors ("DSPs"), and processors based on a multi-core processor architecture, as non-limiting examples.

The transceiver 4 of the communication element 7 modulates information onto a carrier waveform for transmission by the communication element via the antenna to another communication element. The transceiver 4 demodulates information received via the antenna for further processing by other communication elements.

The memory 6 of the communication element 7, as introduced above, may be of any type suitable to the local application environment, and may be implemented using any suitable volatile or non-volatile data storage technology, such as a semiconductor-based memory device, a magnetic memory device and system, an optical memory device and system, fixed memory, and removable memory. The programs stored in the memory 6 may include program instructions that, when executed by an associated processor 2, enable the communication element 7 to perform tasks as described herein. Exemplary embodiments of the system, subsystems, and modules as described herein may be implemented, at least in part, by computer software executable by processors of, for instance, the mobile station and the base station, or by hardware, or by combinations thereof. Other programming may be used such as firmware and/or state machines. As will become more apparent, systems, subsystems and modules may be embodied in the communication element 7 as illustrated and described above.

Figure 3:
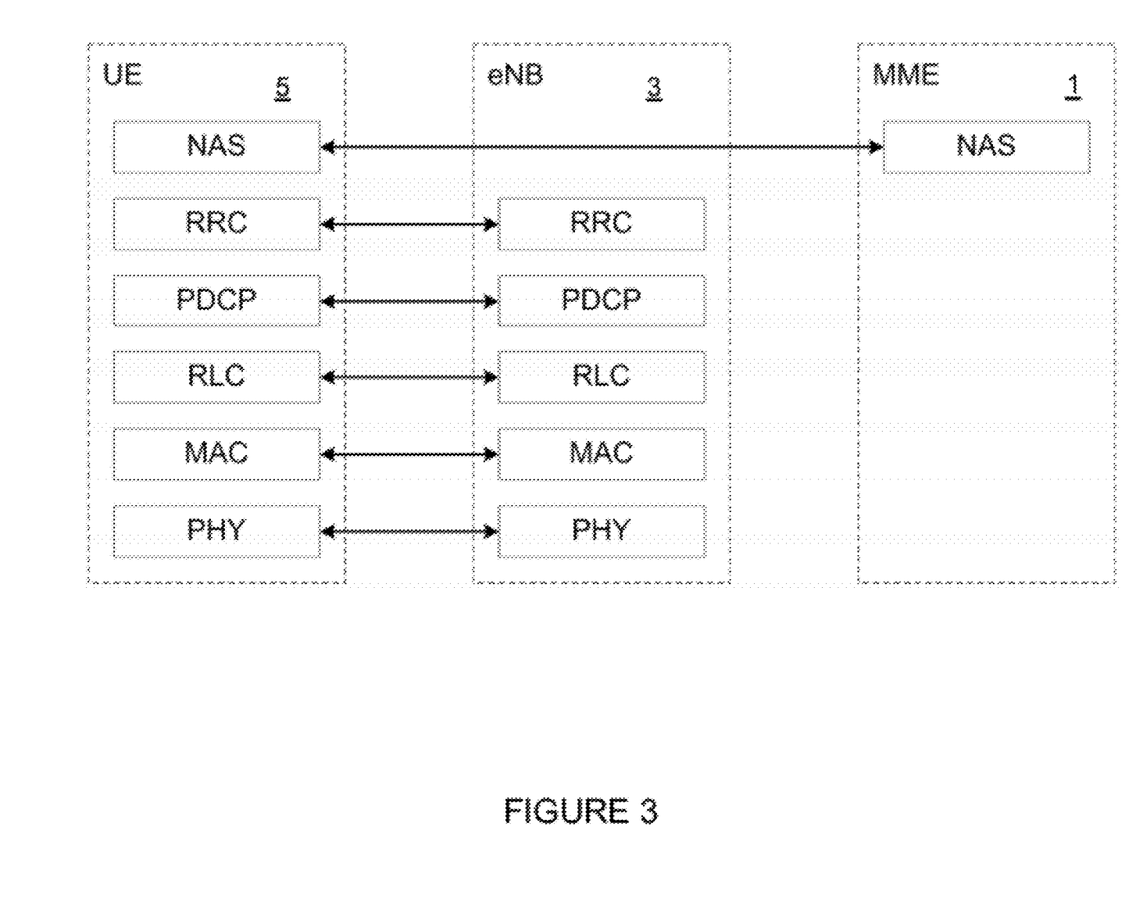
FIG. 3 illustrates a block diagram of a communication terminal according to an advantageous embodiment of the present invention.

FIG. 3 depicts a block diagram of an embodiment of user equipment 5 and a base station 3 constructed according to the principles of certain embodiments. The user equipment UE 5 and the base station eNB 3 each include a variety of layers and subsystems: the physical layer ("PHY") subsystem, a medium access control layer ("MAC") subsystem, a radio link control layer ("RLC") subsystem, a packet data convergence protocol layer ("PDCP") subsystem, and a radio resource control layer ("RRC") subsystem. Additionally, the user equipment 5 and the mobile management entity ("MME") 1 include a non-access stratum ("NAS") subsystem.

The physical layer subsystem supports the physical transport of packets over the LTE air interface and provides, as non-limiting examples, CRC insertion, for example, a 24 bit CRC is a baseline for physical downlink shared channel ("PDSCH"), channel coding, hybrid asynchronous retransmit request ("HARQ") processing, and channel interleaving. The physical layer subsystem also performs scrambling such as transport-channel specific scrambling on a downlink-shared channel ("DL-SCH"), broadcast channel ("BCH") and paging channel ("PCH"), as well as closed multicast channel ("MCH") scrambling for all cells involved in a specific multimedia broadcast multicast service single frequency network ("MBSFN") transmission. The physical layer subsystem also performs signal modulation such as QPSK, 16 QAM and 64 QAM, layer mapping and pre-coding, and mapping to assigned resources and antenna ports. The media access layer or MAC performs the HARQ functionality and other important functions between the logical transport layer, or Level 2, and the physical transport layer, or Level 1.

Figure 4:
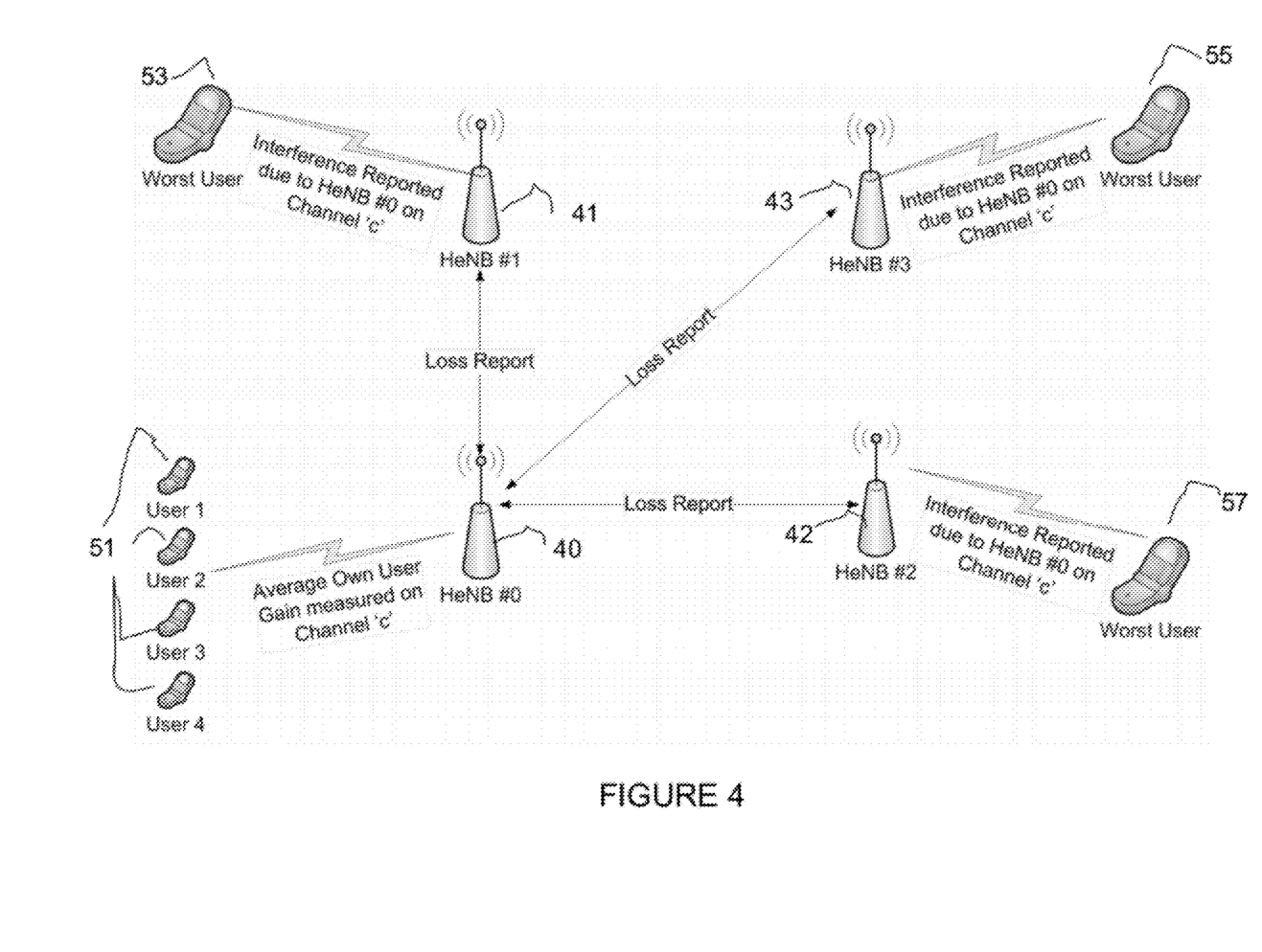
FIG. 4 illustrates an example illustrative system for use with the embodiments.

Each layer is implemented in the system and may be implemented in a variety of ways. A layer such as the PHY in the UE 5 may be implemented using hardware, software, programmable hardware, firmware, or a combination of these as is known in the art. Programmable devices such as DSPs, reduced instruction set ("RISC"), complete instruction set ("CISC"), microprocessors, microcontrollers, and the like may be used to perform the functions of a layer. Reusable design cores or macros as are provided by vendors as ASIC library functions, for example, may be created to provide some or all of the functions and these may be qualified with various semiconductor foundry providers to make design of new UEs, or eNode B implementations, faster and easier to perform in the design and commercial production of new devices. FIG. 4 depicts an example illustrative environment for application of the embodiments. In FIG. 4, neighboring HeNBs 40, 41, 42 and 43 correspond to an HeNB #0, #1, #2 and #3 that may interfere with one another (users connected over an air interface to one of these stations may experience interference due to the use of the air interface by user equipment communicating with another one of these stations). While in the exemplary embodiments presented herein for illustrative purposes, the base stations are shown as HeNBs, the embodiments are not so limited and have application in any communications system where base stations serving a local area may interfere with neighboring base stations when channels are added, the embodiments have particular application to systems using femtocells, HeNBs, microcells and the like. In future developments a UE may be configured to act as a base station or HeNB itself, allowing local devices to access the network using the UE as the eNB, and in this case the UE is a master device with all of the features of the HeNB described above.

In FIG. 4, user equipments ("UEs") 51 are communicating with and serviced by HeNB #0, number 40 in the figure. UE 53 is one of the UEs communicating with HeNB#1, number 41 in the figure. Similarly, UE 55 is communicating with HeNB#3, number 43 in the figure, and UE 57 is communicating with HeNB#2, numbered 42 in the figure.

In this non-limiting example application illustrating the embodiments, HeNB#0 wants to add a channel "c" to add capacity for service in its local cell. Adding this channel will cause interference in the remaining cells served by HeNB#1, HeNB#2, and HeNB#3 if the same channel is in use in those cells. The figure illustrates messages between the UEs and the associated HeNB in each of the cell areas, and communication between the HeNBs, as will be further described below.

Certain embodiments provide alternative algorithms, methods and implementations for providing carrier aggregation for HeNBs or similar local area base station equipment in a radio frequency signaling system. These base stations are typically used to add cellular services to a building, home, office, campus or other small local area where users with similar needs for services may congregate. Typically, these base stations, sometimes called "femto-cells", are designed to serve user equipments in a limited physical area; for example, a service local area with a radius of 30 or 50 meters. In the local area the user equipments will often have a common resource allocation, that is, a "whitelist" or "closed subscriber group" may be used to decide which UEs can connect to the base station. As one non-limiting example, members of a household may permanently register their UEs with the HeNB for their home, so that the base station knows these devices and allows access, while UEs that happen to be in physical proximity that are not part of the group are not allowed to connect to the HeNB. However, due to the proximity of multiple ones of such devices with respect to each other, interference between channels used by one such device and the neighboring cells will occur.

Certain embodiments provide methods and apparatuses for facilitating a distributed channel assignment scheme for local area base station environments. In the embodiments, when an HeNB (for example) attempts to add a new channel to its services, it causes interference to neighboring cells where the channel is already in use. In certain embodiments, the HeNB trying to add the new channel will measure the average capacity gain estimated for its own cell UEs, and then compare the gain with the capacity loss reported from the neighboring HeNBs when the new channel is added. A loss report is generated, which contains the capacity loss by the UE experiencing the worst channel conditions in each of the neighboring cell(s). In an embodiment, if the capacity gain experienced by the HeNBs own UEs is greater than the summed capacity loss experienced by UEs in neighboring cells, the channel is added. Other predetermined thresholds or decision points could be used as alternatives to the simple "greater than" threshold for the decision. In an example embodiment, the number of neighbor cells to be considered can be limited to a certain number. The gain and loss measurements can be averaged, scaled by a certain factor, or otherwise evaluated. The "sums" for gains and losses as used in this description need not be limited to a simple arithmetic sum, as alternatives in additional embodiments, weighting or scaling factors may be used, or some other arithmetic or statistical factors may be applied, so that additional considerations may be taken into account. These alternatives may allow for faster calculation or for additional information to be included without treating each UE in each neighbor cell individually. In any event, if the gain accomplished gives better performance than the losses due to the added channel, the new channel is added or retained. But, in contrast, if the gain is less than the capacity loss experienced in neighboring cells, the new channel is not added, or is dropped. Thus, the channel is only added by the HeNB in the example application if the overall system capacity is increased; if not, then the new channel is dropped.

Returning to FIG. 4, which depicts an exemplary system for use with the embodiments, an example situation is depicted. In FIG. 4, HeNB#0, numbered 40, desires to add a new channel 'c' to its cell. The UEs 51 attached to and serviced by this HeNB then report the increased capacity gain to HeNB#0. The increase in capacity can be estimated, for example, by channel quality indicators reported by the UE for the new channel 'c'. After the new channel is added, each of the neighboring base stations HeNB#1, HeNB#2 and HeNB#3, numbered 41, 42 and 43 respectively, also receive/ask for reports from their connected UEs of the interference experienced due to the new use of channel 'c' by HeNB#0, or receive a channel quality indicator feedback. The HeNBs#1, #2 and #3 in each case generate a loss report that is communicated back to HeNB#0. By comparing the feedback with the reported channel quality indicators that were received before HeNB#0 added the channel, HeNBs#1, #2 and #3 can estimate the loss in capacity. Then HeNB#0 may compare the gain in capacity by its UEs due to the new channel to the loss in capacity in the neighboring cells, and determine whether the gain is greater than the loss. In alternative embodiments, instead of comparing gain and loss in capacity, the increase or decrease in SINR can be compared in the cell serviced by HeNB#0 due to the added channel to the SINR in the neighboring cells, or a look up table containing channel quality indicator information, SINR information, or loss reports previously stored may be used.

In certain method embodiments, the average capacity increase of cell users served by the HeNB that intends to add the channel is compared with the loss of capacity experienced by the "J" worst users in the interfered neighboring cells. The number of neighboring cells to be considered can be limited to make the necessary calculations reasonable, so that the time required is kept short and system resources are not overburdened. Using the worst users in the neighboring cells for the capacity loss estimate emphasizes the performance of heavy interfered users and may ensure that they are do not experience a service outage. The sum or other selected measure of the losses experienced by the user experiencing the worst channel conditions in the newly added channel in the neighboring cells is used in certain embodiments. In certain embodiments the T users experiencing the highest capacity loss are considered. This sum or other loss measure is compared with the capacity gain experienced by users of the HeNB adding the channel, and a comparison is used in the decision making process that decides whether to add the channel. In order to make the comparison, communication between HeNBs is performed. This can be done through the network, by a network manager, or in some instances, over the air interface directly or relayed by user equipments.

In certain embodiments of a method, the channel quality indicator estimates used are measured by UEs before, and again after, the new channel is added. The channel quality indicator ("CQI") can be an SINR estimate, a RSRQ or similar. The CQI estimates are sent back to the HeNBs. The HeNBs estimate the capacity loss based on the CQI reported on each of the channels for all the UEs. The average gain value is also estimated based on similar measurements reported by UEs for the particular HeNB trying to add the channel. Based on a comparison of the capacity gained by the particular HeNB to the capacity lost by the neighboring cells, a decision is made on whether to keep the added channel.

Figure 5:
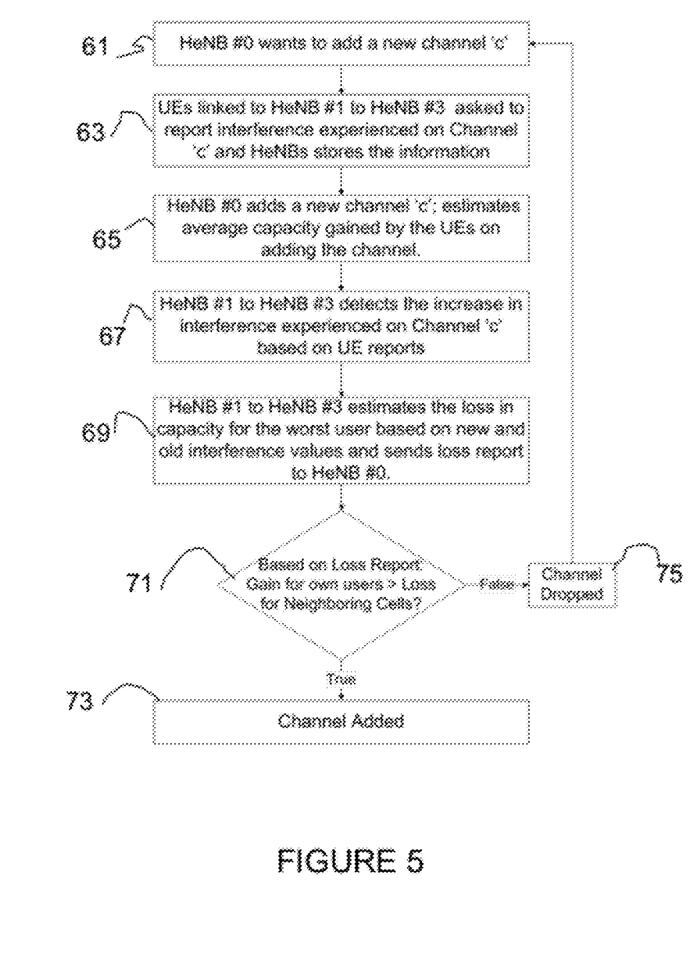
FIG. 5 illustrates a method embodiment in a flow chart diagram.

In FIG. 5, a method embodiment is illustrated as a flow chart. In step 61, a determination is made that an additional channel is desired by an HeNB. In this example, HeNB#0 desires to add a channel, channel 'c' is used as an non-limiting example. In step 63, UEs linked to the neighboring HeNBs are asked to report interference experienced on the channel being added. In step 65, the HeNB adds the new channel 'c'. Further, the UEs and HeNB#0 estimate the average capacity gained by adding the new channel.

The method then transitions to step 67. In step 67, the UEs connected to each of the neighboring HeNBs, #1-#3, detect the increase in interference experienced on channel 'c'. In step 69, the neighboring HeNBs, #1-#3 in FIG. 4 for example, estimate the loss in capacity for the worst user based on the new and old CQI values, and this loss report is sent to HeNB#0. In step 71, a decision is made by HeNB#0 based on the comparison of the gain in capacity for users in its own cell area, to the loss of capacity for the neighboring cells. In this example, if the gain is greater than the loss, the method transitions to step 73 and the channel is added by HeNB#0. If the loss by the neighboring cells is greater than the gain, then the channel is dropped in step 75. As alternatives in step 71, some margin or threshold other than a simple comparison could be used in the decision block. Also, the decision could be made not by the HeNB#0, but by a network manager such as an MME, based on receiving the reports from the HeNBs.

As an alternative approach, in step 69 in FIG. 5, different users are considered other than the worst user in the neighboring cells. In this alternative embodiment, the worst user loss in the neighboring cell is used if and only if the newly added channel was the best channel for that worst user before the assignment was done. If the newly added channel was not the best channel for the worst user in the neighboring cell, then the worst user loss is ignored, and instead the second worst user loss is reported by the neighboring cells. Since the channel being added in the neighboring cell was not the best channel for that worst user, the scheduler will not in fact schedule that channel for that user. Thus, ignoring the impact on that user of adding the new channel will not cause any impact on the capacity for that user. Instead, the second worst user is evaluated. Please note that instead of a single worst user, the algorithm might consider a set of worst users with highest capacity loss on the channel or worst overall CQI estimate. Further, the second worst user may be a set of second worst users. The loss and gain of users may be averaged, normalized or scaled.

A study was made based on the embodiments described above and the approaches were compared with the known prior ACCS proposal described above. The results were that the embodiments had results better than that of the ACCS approach without the need for a priori knowledge of the target SINR values. This aspect of the embodiments provides a simpler implementation and faster performance than would be obtained using the ACCS scheme.

Figure 6:
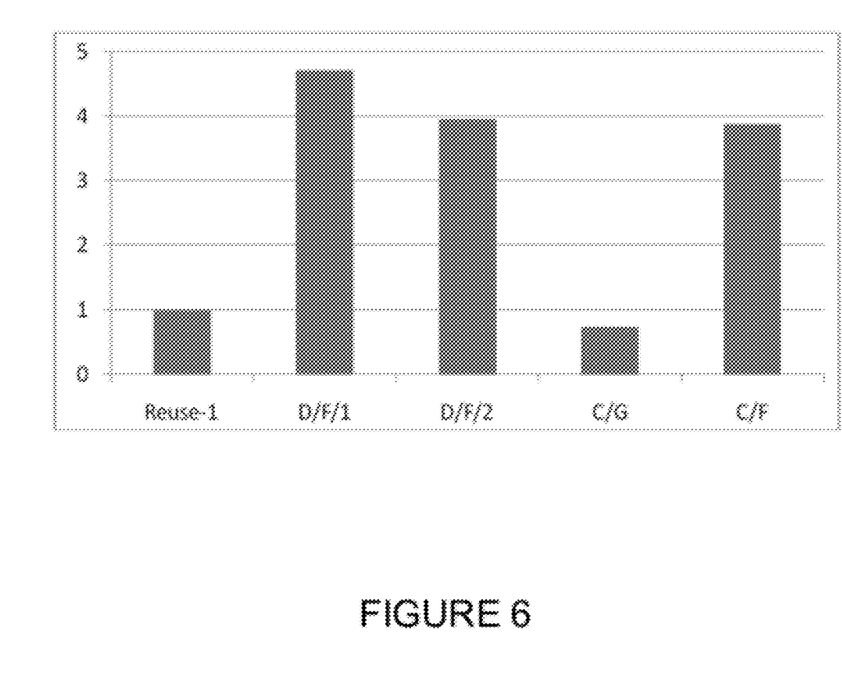
FIG. 6 illustrates a graph comparing user throughput cumulative distribution function results obtained using embodiments with other carrier allocation schemes.
Figure 7:
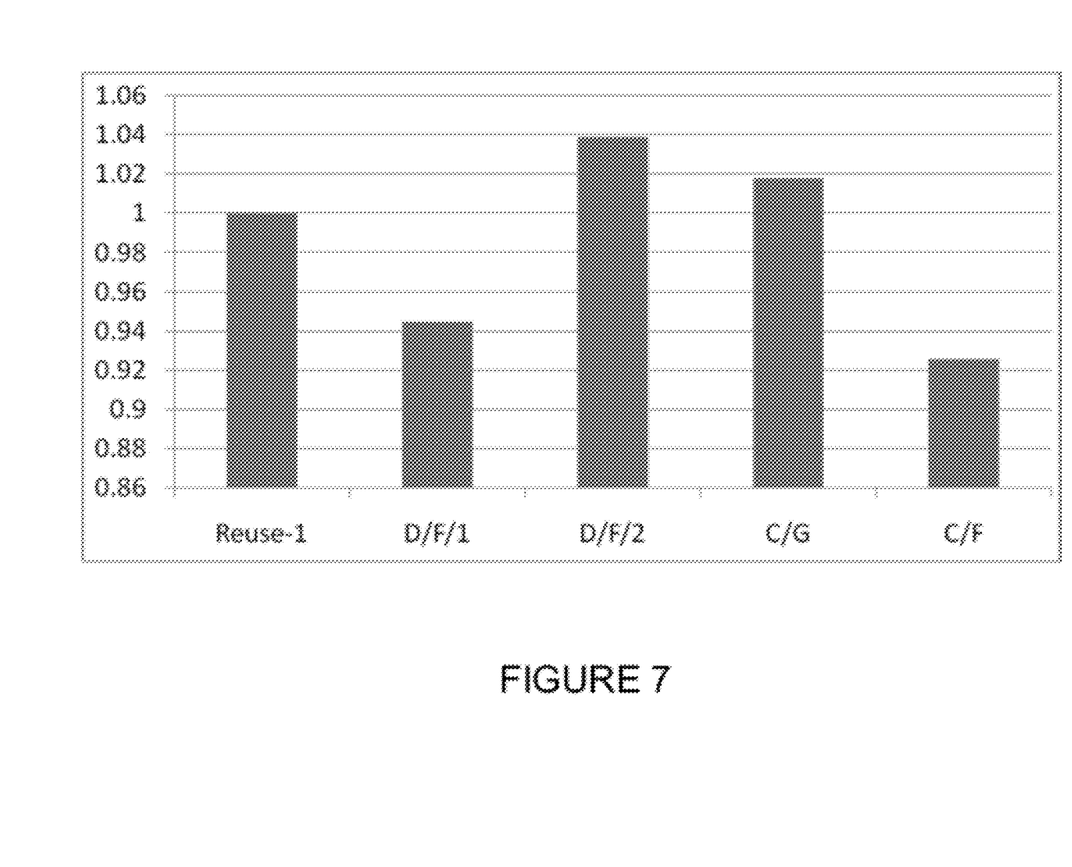
FIG. 7 illustrates a graph comparing mean throughput results obtained using the embodiments to other carrier allocation schemes.

The scenario used for study of the embodiments is close to the 'extended' scenario defined in the papers incorporated above, but with lower values of spectral efficiency and antenna gains. In FIG. 6, the user throughput cumulative distribution function ("CDF") curves are compared to a Reuse-1 normalized scheme. In FIG. 7, the mean throughput for each scheme is again compared to a Reuse-1 which is normalized.

As described in the papers, ACCS gives 4 times the 5th percentile throughput compared to Reuse-1 with almost no loss in mean throughput value. For the embodiment where the "worst user" is used for the loss reports to compare the gain to, labeled curve D/F/1, as shown in FIG. 6, gives 4.5 times the 5th percentile throughput of Reuse-1 with a loss of only 5% in the mean throughput value (also labeled D/F/1, shown in FIG. 7). For the alternative embodiment where the "second worst" user may be used if the "worst user" would not be assigned the newly added channel, labeled curve D/F/2, this embodiment gives 4 times the 5th percentile throughput (FIG. 6) with a 4% gain in the mean throughput value, as shown in FIG. 7.

The performance of the embodiments is at least comparable to the prior ACCS approach, with lower system complexity, lesser amount of statistical data collection required for decision-making and without the assumption of any a priori knowledge of target SINR values. This makes the system utilizing the embodiments much simpler to implement, lower in cost, and keeps the decision making process fast.

The study also compared the embodiments to a centralized greedy (C/G) scheme. This centralized approach assumes the presence of a centralized entity that makes channel assignment which maximizes the mean throughput in each building. A centralized fair (C/F) scheme is also studied in which the centralized entity goes for a channel allocation which maximizes the throughput of the worst user in each cell in a building. The curves labeled C/G and C/F in each of FIGS. 6 and 7 present the results. This comparison is helpful to compare the lower percentile and mean throughput values of the embodiments to a centralized entity approach. In FIG. 6, it can be seen that the 5th percentile throughput value of the embodiments, curves labeled D/F/1 and D/F/2, is at par with the centralized C/F scheme. From FIG. 7 it can be seen that the embodiment curve D/F/1 has a slight loss of around 6% as compared to the centralized greedy scheme labeled C/G, whereas the alternative embodiment labeled D/F/2 gives mean throughput value slightly better than C/G. From the study results the distributed schemes of the embodiments have a performance very close to the centralized ones, but at a lower cost of implementation.

Embodiments may be implemented as hardware, software, firmware, or combinations of these. For programmable receivers having a processor, microprocessor or the like that is capable of implementing steps of a method stored as computer instructions, the embodiments may be provided as executable code stored in a machine readable form. The storage may be storage in a non-transitory computer readable medium.

Although the description thus far describes, for illustrative purposes, the use of the embodiments in HeNBs, the embodiments may be applied to any application where aggregating carriers in base stations serving local areas that may have interference with neighboring base stations is applicable.

In an embodiment, a method comprises: determining in a base station servicing user equipments in a local area in an over the air interface for communications at a radio frequency that an additional channel is needed, receiving reports from user equipment connected to the base station over the air interface indicating the gain in capacity that would occur due to the added channel, adding the new channel and communicating to one or more user equipments over the new channel; receiving loss reports from one or more neighboring base stations indicating the loss in capacity and the interference caused to user equipments serviced by the neighboring base stations due to the use of the new channel; comparing the gain in capacity by the user equipments connected to the base station to the loss of capacity by the user equipments connected to the neighboring base stations due to the added channel; and based on the comparison, determining whether to continue to add the channel to increase capacity. In a further embodiment, the above method steps are performed wherein the determining is based on whether the added capacity is greater than the sum of the lost capacity from each of the neighboring cells user equipments with the highest loss reports.

In another embodiment, an apparatus comprises at least one processor; and at least one memory including computer program code, the at least one memory and the computer program code configured to, with the at least one processor, cause the apparatus at least to perform determining that an additional channel is needed for a base station servicing user equipments over an air interface in a local area, receiving reports from user equipment connected to the base station over the air interface indicating the gain in capacity that would occur due to the added channel, adding the new channel and communicating to one or more of the user equipments over the new channel; receiving loss reports from one or more neighboring base stations each servicing a local area indicating the loss in capacity and the interference caused to user equipments serviced by the neighboring base stations due to the use of the new channel; comparing the gain in capacity by the user equipments connected to the base station to the loss of capacity by the worst user connected to the neighboring base stations due to the use of the newly added channel; and based on the comparison, determining whether to continue to add the channel to increase capacity. In a further embodiment, the at least one processor; and at least one memory including computer program code, the at least one memory and the computer program code configured to, with the at least one processor, cause the apparatus at least to perform the above steps wherein the determining is based on whether the added capacity is greater than the sum of the lost capacity from each of the neighboring cells worst user reports.

In yet another embodiment, a computer program product is provided comprising a program code stored in a tangible form in a computer readable medium, configured to cause an apparatus comprising at least one processor and at least one memory to at least perform: determining that an additional channel is needed for a base station servicing user equipments over an air interface in a local area, receiving reports from user equipment connected to the base station over the air interface indicating the gain in capacity that would occur due to the added channel, adding the new channel and communicating to one or more of the user equipments over the new channel; receiving loss reports from one or more neighboring base stations each servicing a local area indicating the loss in capacity and the interference caused to user equipments serviced by the neighboring base stations due to the use of the new channel; comparing the gain in capacity by the user equipments connected to the base station to the loss of capacity by the worst user connected to the neighboring base stations due to the use of the newly added channel; and based on the comparison, determining whether to continue to add the channel to increase capacity. In a further embodiment, the computer program code, computer program code is further configured to, with the at least one processor, cause the apparatus at least to perform the above steps wherein the determining is based on whether the added capacity is greater than the sum of the lost capacity from each of the neighboring cells worst user reports.

In a further embodiment, a method comprises: determining in a base station servicing a local area in an over the air interface for communications at a radio frequency that an additional channel is needed, receiving reports from user equipment connected to the base station over the air interface indicating the gain in capacity that would occur due to the added channel, adding the new channel and communicating to one or more user equipments over the new channel; receiving loss reports from one or more neighboring base stations indicating the loss in capacity and the interference caused to user equipments serviced by the neighboring base stations due to the use of the new channel; comparing the gain in capacity by the user equipments connected to the base station to the loss of capacity by the worst user connected to the neighboring base stations due to the added channel if the worst user is likely to use the added channel, otherwise the loss of capacity in each of the neighboring base stations is determined using the second worst user connected to the neighboring base station; and, based on the comparison, determining whether to continue to add the channel to increase capacity. In a further embodiment, the above method steps are performed wherein the determining is based on whether the added capacity is greater than the sum of the lost capacity from each of the neighboring cells worst user reports.

In another embodiment, an apparatus comprises at least one processor; and at least one memory including computer program code, the at least one memory and the computer program code configured to, with the at least one processor, cause the apparatus at least to perform determining in a base station servicing user equipments in a local area in an over the air interface for communications at a radio frequency that an additional channel is needed, receiving reports from user equipment connected to the base station over the air interface indicating the gain in capacity that would occur due to the added channel, adding the new channel and communicating to one or more user equipments over the new channel; receiving loss reports from one or more neighboring base stations indicating the loss in capacity and the interference caused to user equipments serviced by the neighboring base stations due to the use of the new channel; comparing the gain in capacity by the user equipments connected to the base station to the loss of capacity by the set of users with the highest loss in capacity connected to the neighboring base stations due to the added channel if the added channel was part of the best set of channels for one or more of this set of users, otherwise the loss of capacity in each of the neighboring base stations is determined using the set of second worst users connected to the neighboring base station; and, based on the comparison, determining whether to continue to add the channel to increase capacity.

In another embodiment, a method comprises: determining in a base station servicing a plurality of user equipments in a local area in an over the air interface for communications at a radio frequency that an additional channel is needed, receiving reports from user equipment connected to the base station over the air interface indicating the gain in capacity that would occur due to the added channel, adding the new channel and communicating to one or more user equipments over the new channel; receiving loss reports from one or more neighboring base stations indicating the loss in capacity and the interference caused to user equipments serviced by the neighboring base stations due to the use of the new channel; comparing the gain in capacity by the user equipments connected to the base station to the loss of capacity by the worst user equipments obtained by averaging the loss suffered by a selected set of user equipments, considering changes in CQI, alternatively considering changes in SINR and or other interference or reception indicators. The averaged loss may be compared to a threshold, to the gain in the cell serviced by the UE adding the channel, or to other criteria. The method continues by determining whether to continue to add the channel to increase capacity based on the comparison, if the gain exceeds a criteria over the averaged loss experienced due to the added interference, the added channel is retained; otherwise, it is not.

In another embodiment, a method comprises: determining in a base station servicing a local area in an over the air interface for communications at a radio frequency that an additional channel is needed, receiving reports from user equipment connected to the base station over the air interface indicating the gain in capacity that would occur due to the added channel, adding the new channel and communicating to one or more user equipments over the new channel; receiving loss reports from one or more neighboring base stations indicating the loss in capacity and the interference caused to user equipments serviced by the neighboring base stations due to the use of the new channel; comparing the gain in capacity by the user equipments connected to the base station to the loss of capacity by the worst user equipments obtained by averaging the loss suffered by a selected set of user equipments, considering changes in CQI, alternatively considering changes in SINR and or other interference or reception indicators. The averaged loss may be compared to a threshold, to the gain in the cell serviced by the UE adding the channel, or to other criteria. In addition the worst user, each user, or some selected users in each cell are checked to ensure a minimum SINR is obtained after the newly added channel is used. This ensures that the added channel will not reduce SINR in a neighboring cell to a level below a minimum required SINR for acceptable communication. The then method continues by determining whether to continue to add the channel to increase capacity based on the comparison, if the gain exceeds a criteria over the averaged loss experienced due to the added interference, and the minimum SINRs are met in the neighboring cells, the added channel is retained; otherwise, it is not.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   determining in a network device servicing a local area that an additional channel is needed;
   receiving a report from a user equipment connected to the network device over an air interface indicating a gain in capacity that would occur due to the additional channel;
   adding a new channel;
   receiving a loss report from one or more neighboring network devices indicating a loss in capacity of, or interference caused to at least one user equipment serviced by, the one or more neighboring network devices;
   comparing the gain in capacity to the loss in capacity of, or interference caused to, the at least one user equipment; and
   determining whether, based on the comparison, to continue to add the new channel to increase capacity,
   wherein the receiving the loss report comprises receiving a loss report indicating the loss in capacity of, or interference caused to the at least one user equipment serviced by the one or more neighboring network devices due to the use of the new channel.

2. The method of claim 1, wherein the determining is performed in at least one of an access point, a base station, a user equipment acting as a base station, or an adhoc network master node.

3. The method of claim 1, wherein the receiving the report comprises receiving a recent measurement report from the user equipment.

4. The method of claim 1, wherein the receiving the report comprises receiving a report regarding at least one channel other than the added channel.

5. The method of claim 1, wherein the receiving the report comprises receiving a report regarding the additional channel that is determined to be needed.

6. The method of claim 1, further comprising:
   communicating to one or more user equipment over the new channel.

7. The method of claim 1, wherein the comparing the gain comprises comparing the gain to the loss of capacity due to the added channel by at least one of an average user connected to the neighboring network devices, a worst user equipment connected to the neighboring network devices, a best user equipment connected to the neighboring network devices, a random user equipment connected to the neighboring network devices, all user equipment connected to the neighboring network devices, a user equipment with lowest signal to interference plus noise ratio connected to the neighboring network devices, or user equipment with lowest throughput connected to the neighboring network devices.

8. The method of claim 1, wherein the comparing the gain further comprises comparing the gain to a threshold.

9. The method of claim 1, further comprising:
   continuing to add the new channel when the gain is greater than the loss.

10. An apparatus, comprising:
    at least one processor; and
    at least one memory including computer program code,
    wherein the at least one memory and the computer program code are configured to, with the at least one processor, cause the apparatus at least to
    determine in a network device servicing a local area that an additional channel is needed,
    process a report received from a user equipment connected to the network device over an air interface indicating a gain in capacity that would occur due to the additional channel,
    add a new channel,
    process a loss report received from one or more neighboring network devices indicating a loss in capacity of, or interference caused to at least one user equipment serviced by, the one or more neighboring network devices,
    compare the gain in capacity to the loss in capacity of, or interference caused to, the at least one user equipment, and
    determine whether, based on the comparison, to continue to add the new channel to increase capacity,
    wherein the at least one memory and the computer program code are configured to, with the at least one processor, cause the apparatus at least to process the loss reports by processing loss reports indicating the loss in capacity of, or interference caused to the at least one user equipment serviced by, the one or more neighboring network devices due to the use of the new channel.

11. The apparatus of claim 10, wherein the network device comprises at least one of an access point, a base station, a user equipment acting as a base station, or an adhoc network master node.

12. The apparatus of claim 10, wherein the at least one memory and the computer program code are configured to, with the at least one processor, cause the apparatus at least to process the report by processing a recent measurement report from the user equipment.

13. The apparatus of claim 10, wherein the at least one memory and the computer program code are configured to, with the at least one processor, cause the apparatus at least to process the report by processing a report regarding at least one channel other than the added channel.

14. The apparatus of claim 10, wherein the at least one memory and the computer program code are configured to, with the at least one processor, cause the apparatus at least to process the report by processing a report regarding the additional channel that is determined to be needed.

15. The apparatus of claim 10, wherein the at least one memory and the computer program code are configured to, with the at least one processor, cause the apparatus at least to communicate to one or more user equipment over the new channel.

16. The apparatus of claim 10, wherein the at least one memory and the computer program code are configured to, with the at least one processor, cause the apparatus at least to compare the gain by comparing the gain to the loss of capacity due to the added channel by at least one of an average user connected to the neighboring network devices, a worst user equipment connected to the neighboring network devices, a best user equipment connected to the neighboring network devices, a random user equipment connected to the neighboring network devices, all user equipment connected to the neighboring network devices, a user equipment with lowest signal to interference plus noise ratio connected to the neighboring network devices, or user equipment with lowest throughput connected to the neighboring network devices.

17. The apparatus of claim 10, wherein the at least one memory and the computer program code are configured to, with the at least one processor, cause the apparatus at least to compare the gain by comparing the gain to a threshold.

18. The apparatus of claim 10, wherein the at least one memory and the computer program code are configured to, with the at least one processor, cause the apparatus at least to continue to add the new channel when the gain is greater than the loss.

* * * * *